(12) United States Patent
Maeda et al.

(10) Patent No.: US 7,135,803 B2
(45) Date of Patent: Nov. 14, 2006

(54) DYNAMOELECTRIC ROTOR HAVING PERMANENT MAGNETS DISPOSED BETWEEN ADJACENT CLAW-SHAPED MAGNETIC POLES

(75) Inventors: Naohide Maeda, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/108,703

(22) Filed: Apr. 19, 2005

(65) Prior Publication Data
US 2005/0236927 A1    Oct. 27, 2005

(30) Foreign Application Priority Data
Apr. 21, 2004    (JP) .............................. 2004-125975

(51) Int. Cl.
H02K 1/22    (2006.01)
(52) U.S. Cl. ..................................................... 310/263
(58) Field of Classification Search ................ 310/263, 310/156.66–156.73
See application file for complete search history.

(56) References Cited
U.S. PATENT DOCUMENTS

| | | | |
|---|---|---|---|
| 6,172,441 B1 * | 1/2001 | York et al. ................ | 310/263 |
| 6,307,297 B1 * | 10/2001 | Bramson et al. ............ | 310/263 |
| 6,555,944 B1 * | 4/2003 | York .......................... | 310/263 |
| 6,750,587 B1 * | 6/2004 | York et al. .................. | 310/263 |
| 6,806,617 B1 * | 10/2004 | Chen et al. ................. | 310/263 |

FOREIGN PATENT DOCUMENTS

| JP | 10-248221 A | 9/1998 |
|---|---|---|
| JP | 10-313560 A | 11/1998 |

* cited by examiner

*Primary Examiner*—Tran Nguyen
(74) *Attorney, Agent, or Firm*—Sughrue Mion, PLLC

(57) ABSTRACT

The dynamoelectric rotor according to the present invention, includes: a rotor coil; a first pole core body and a second pole core body respectively having: first and second cylindrical portions on which the rotor coil is installed; first and second disk portions; and a plurality of first and second claw-shaped magnetic poles magnetized into North-seeking (N) poles and South-seeking (S) poles; and permanent magnets for reducing magnetic leakage flux between the adjacent claw-shaped magnetic poles, flange portions projecting in a circumferential direction and restricting radial movement of the permanent magnets due to centrifugal force being formed on first and second side surfaces of the claw-shaped magnetic poles, and a groove being formed on the first disk portion of the first pole core body to make the first claw-shaped magnetic poles of the first pole core body displace more than the second claw-shaped magnetic poles of the second pole core body.

13 Claims, 16 Drawing Sheets

DYNAMOELECTRIC ROTOR HAVING PERMANENT MAGNETS DISPOSED BETWEEN ADJACENT CLAW-SHAPED MAGNETIC POLES

BACKGROUND OF THE INVENTION

1. Field of the Invention

The present invention relates to a dynamoelectric rotor including permanent magnets disposed between adjacent claw-shaped magnetic poles, the permanent magnets reducing magnetic leakage flux between the adjacent claw-shaped magnetic poles.

2. Description of the Related Art

Conventionally, in rotors in which a first pole core body and a second pole core body having a plurality of claw-shaped magnetic poles are intermeshed, configurations are known that improve dynamoelectric output by disposing permanent magnets between adjacent claw-shaped magnetic poles to reduce magnetic leakage flux between the claw-shaped magnetic poles. (See Patent Literature 1, for example.)

Patent Literature 1

Japanese Patent Laid-Open No. HEI 10-248221 (Gazette)

In the above dynamoelectric rotor, in order to prevent the permanent magnets from dislodging from the claw-shaped magnetic poles due to centrifugal force, flange portions projecting in a circumferential direction are formed on side surfaces of the claw-shaped magnetic poles.

In such configurations, although tip portion regions of the claw-shaped magnetic poles are displaced in a radial direction due to the centrifugal force, because the first pole core body and the second pole core body have identical shapes and equal rigidity, the first pole core body and the second pole core body are displaced equally in magnitude, and although the permanent magnets can be supported at the root portions of the claw-shaped magnetic poles, which have a high strength, in other words, at two points positioned at diagonally opposite corners of the rectangular permanent magnets, a large bending moment arises in the permanent magnets, and one problem has been that there is a risk that the permanent magnets may be damaged by plastic deformation, or by fatigue failure, etc.

SUMMARY OF THE INVENTION

The present invention aims to solve the above problems and an object of the present invention is to provide a dynamoelectric rotor enabling a bending moment acting on permanent magnets to be reduced, and also enabling damage to the permanent magnets by plastic deformation, or by fatigue failure, etc., to be prevented.

In order to achieve the above object, according to one aspect of the present invention, there is provided a dynamoelectric rotor including a rotor coil for generating a magnetic flux; a first pole core body and a second pole core body disposed so as to face each other, respectively having: first and second cylindrical portions on which the rotor coil is installed; first and second disk portions extending radially outward from first and second end portions of the first and second cylindrical portions; and a plurality of first and second claw-shaped magnetic poles extending axially inward from the first and second disk portions so as to alternately intermesh with each other, the first and second claw-shaped magnetic poles covering the rotor coil and being magnetized into North-seeking (N) poles and South-seeking (S) poles by the magnetic flux; and permanent magnets disposed between adjacent pairs of the first and second claw-shaped magnetic poles, the permanent magnets reducing magnetic leakage flux between the adjacent claw-shaped magnetic poles, flange portions projecting in a circumferential direction and restricting radial movement of the permanent magnets due to centrifugal force being formed on first and second side surfaces of the claw-shaped magnetic poles, and tip portion regions of the first claw-shaped magnetic poles of the first pole core body and tip portion regions of the second claw-shaped magnetic poles of the second pole core body being displaced radially outward relative to respective root portions due to the centrifugal force, wherein the dynamoelectric rotor further includes: a displacement increasing means for making the first claw-shaped magnetic poles of the first pole core body displace more than the second claw-shaped magnetic poles of the second pole core body.

Using a dynamoelectric rotor according to the present invention, a bending moment acting on permanent magnets can be reduced, and damage to the permanent magnets by plastic deformation, or by fatigue failure, etc., can also be prevented

DETAILED DESCRIPTION OF THE PREFERRED EMBODIMENTS

Figure 1:
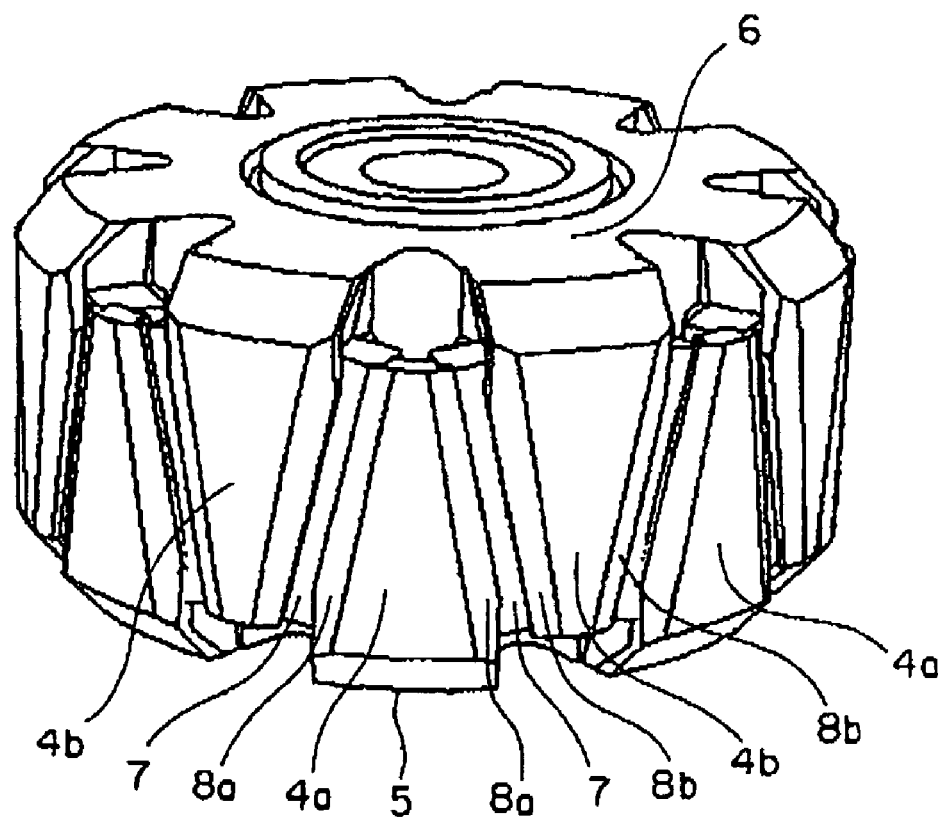
FIG. 1 is a perspective showing an automotive alternator rotor according to Embodiment 1 of the present invention.

Preferred embodiments of the present invention will now be explained, and identical or corresponding members and portions in the drawings will be given identical numbering.

Embodiment 1

Figure 2:
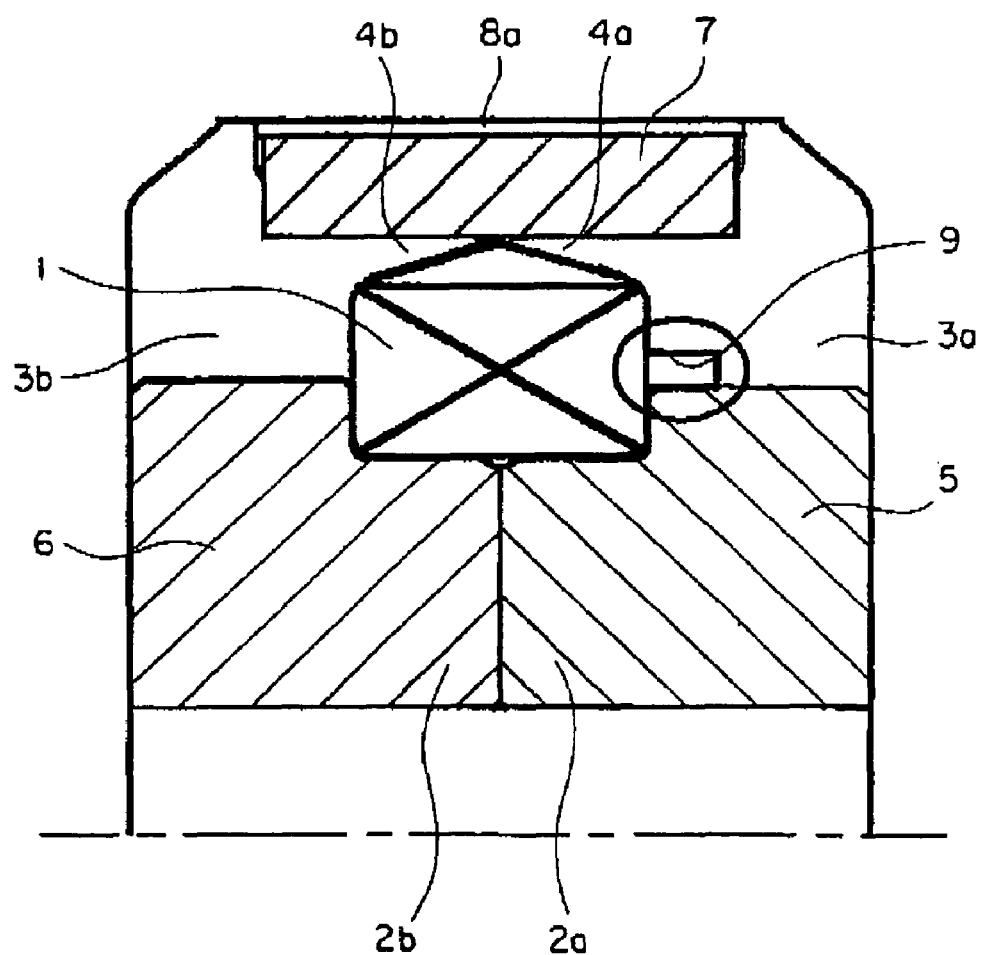
FIG. 2 is a partial cross section showing the rotor from FIG. 1.

FIG. 1 is a perspective showing an automotive alternator rotor according to Embodiment 1 of the present invention, and FIG. 2 is a partial cross section showing the rotor from FIG. 1.

In this rotor, a pole core covers a rotor coil 1 for generating a magnetic flux.

The pole core is constituted by a first pole core body 5 and a second pole core body 6 disposed so as to face each other, respectively having: first and second cylindrical portions 2a and 2b on which the rotor coil 1 is installed; first and second disk portions 3a and 3b extending radially outward from first and second end portions of the first and second cylindrical portions 2a and 2b; and a plurality of first and second claw-shaped magnetic poles 4a and 4b extending axially inward from the first and second disk portions 3a and 3b so as to alternately intermesh with each other, the first and second claw-shaped magnetic poles 4a and 4b covering the rotor coil 1 and being magnetized into North-seeking (N) poles and South-seeking (S) poles by the above-mentioned magnetic flux.

Permanent magnets 7 are disposed between adjacent claw-shaped magnetic poles 4a and 4b to reduce magnetic leakage flux between the adjacent claw-shaped magnetic poles 4a and 4b.

Flange portions 8a and 8b projecting in a circumferential direction and restricting movement of the permanent magnets 7 in a radial direction due to centrifugal force are formed on first and second side surfaces of each of the first and second claw-shaped magnetic poles 4a and 4b.

A groove 9 extending in a circumferential direction is formed on a side of the first disk portion 3a of the first pole core body 5 near the rotor coil 1. The first disk portion 3a of the first pole core body 5 having this groove 9 constitutes a displacement increasing means for making tip portions of the first claw-shaped magnetic poles 4a of the first pole core body 5 displace more in a radial direction relative to root portions due to centrifugal force than tip portions of the second claw-shaped magnetic poles 4b of the second pole core body 6.

Load acting on the permanent magnets 7 accompanying rotation of the rotor will be explained below.

Figure 3:
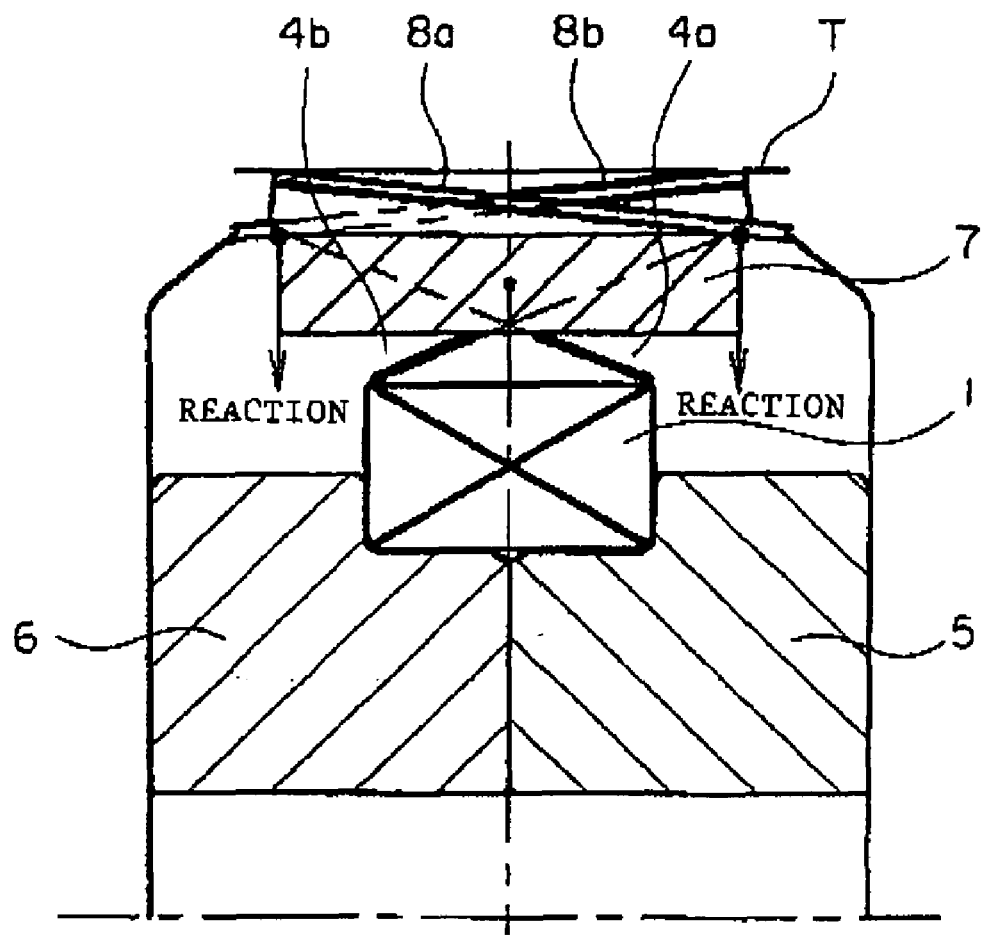
FIG. 3 is a partial cross section showing a conventional rotor during rotation.
Figure 4:
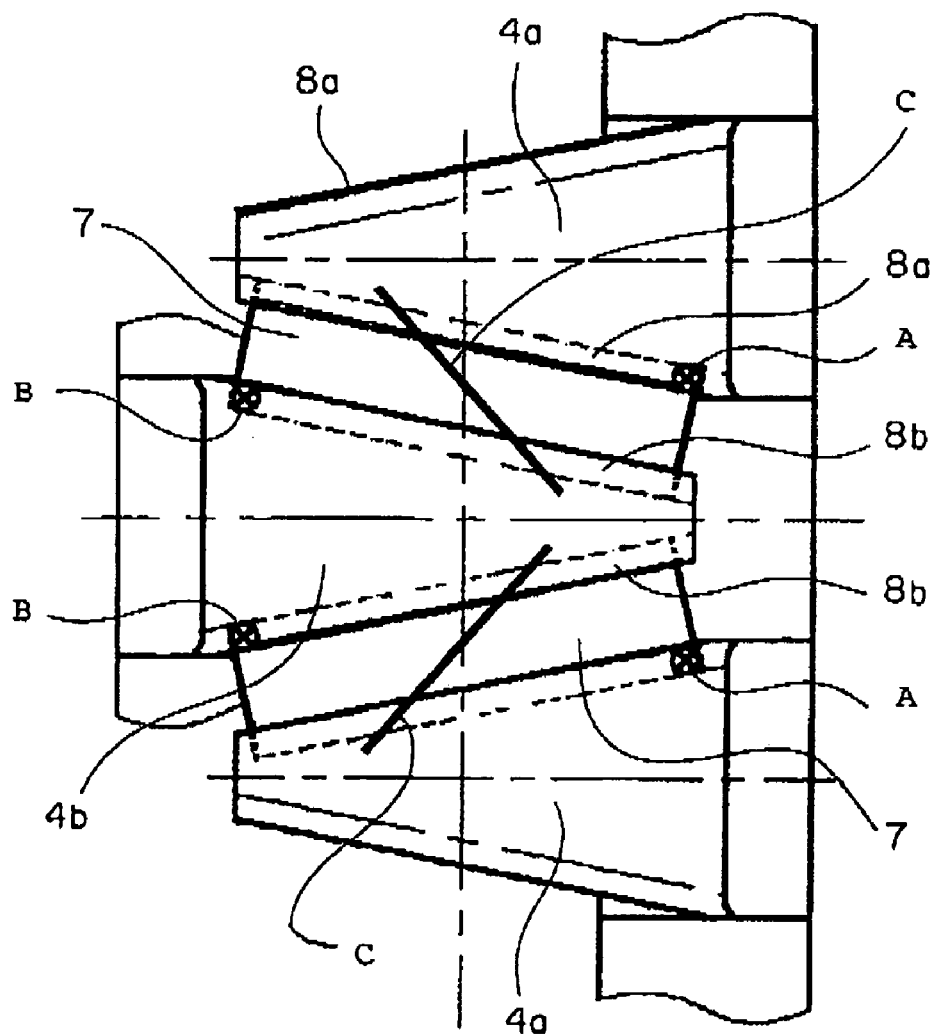
FIG. 4 is a developed plan showing the rotor from FIG. 3.
Figure 5:
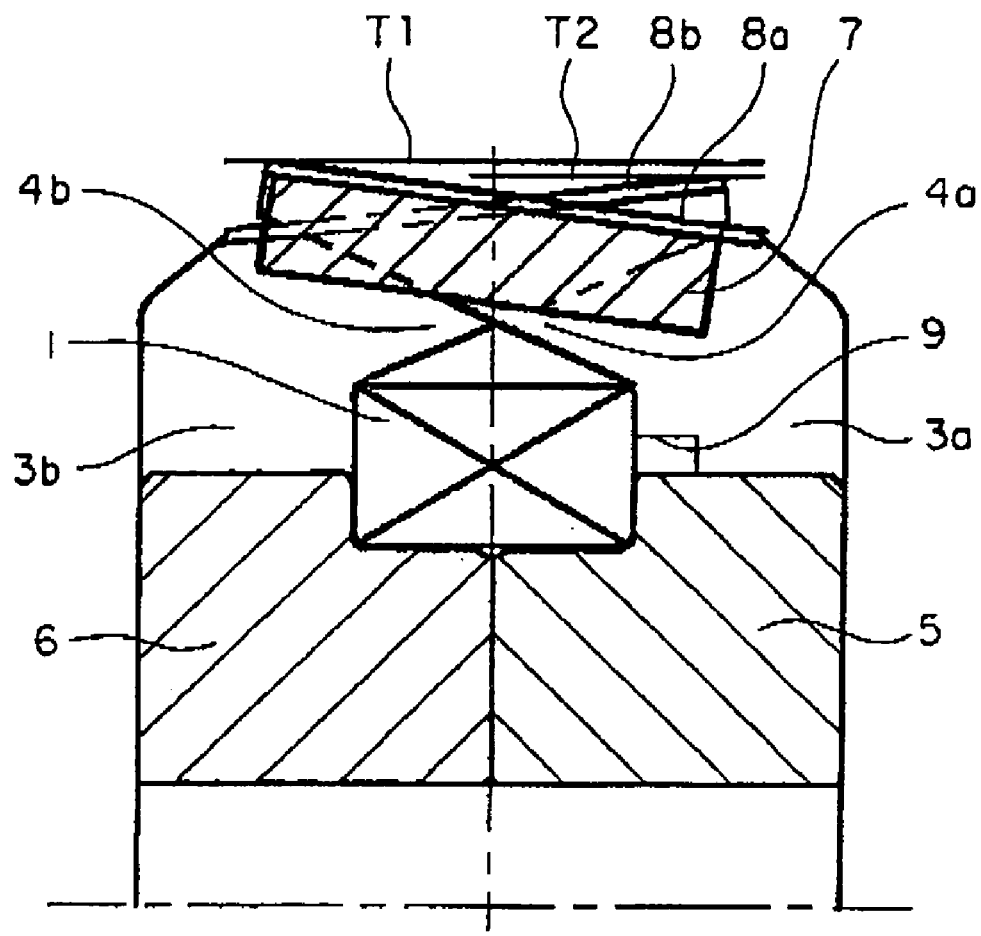
FIG. 5 is a partial cross section showing the rotor from FIG. 1 during rotation.
Figure 6:
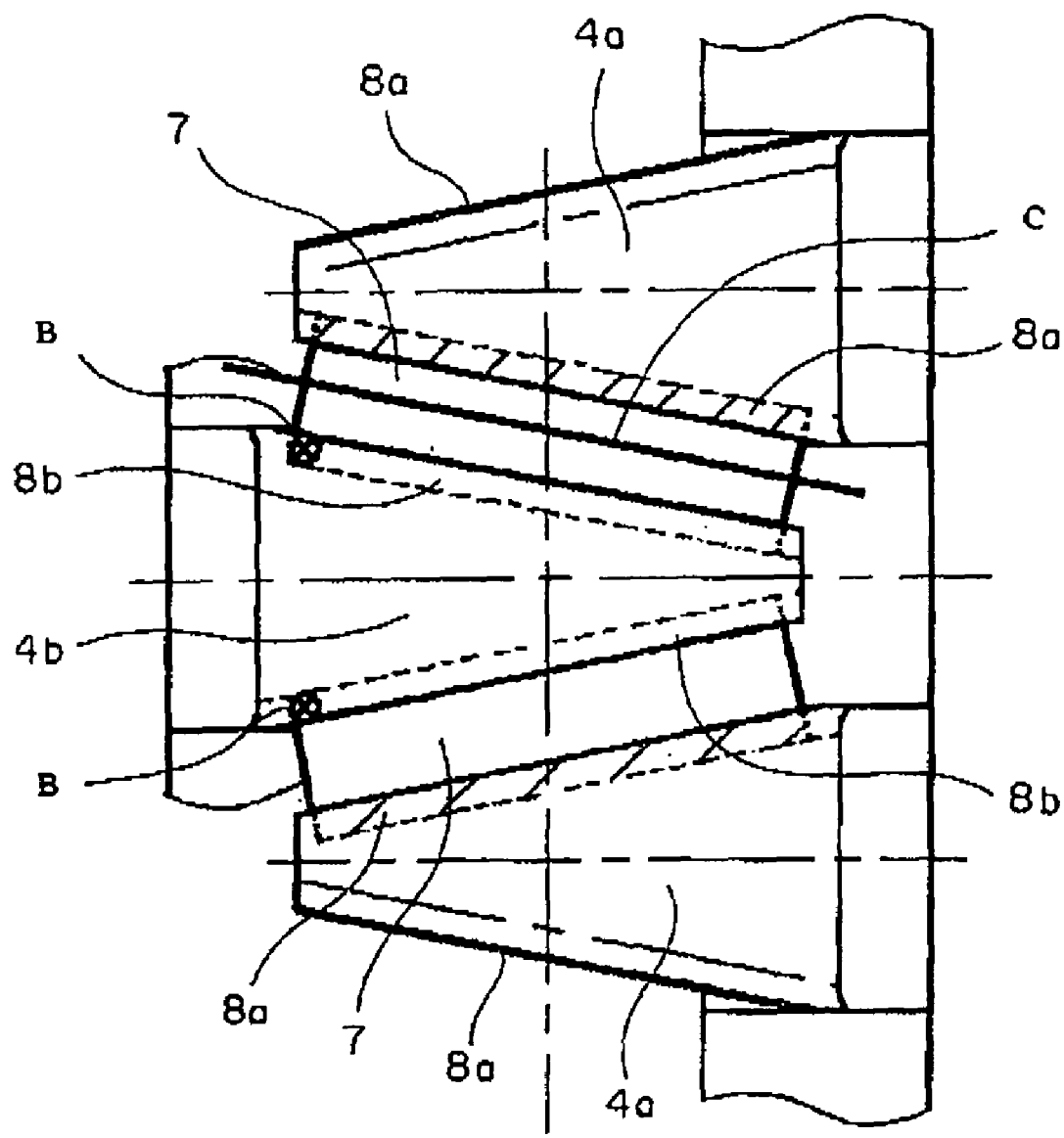
FIG. 6 is a developed plan showing the rotor from FIG. 5.

FIG. 3 is a partial cross section showing the above conventional rotor, FIG. 4 is a developed plan showing first and second claw-shaped magnetic poles 4a and 4b from FIG. 3 when opened out, FIG. 5 is a partial cross section showing the rotor according to Embodiment 1, and FIG. 6 is a developed plan showing first and second claw-shaped magnetic poles 4a and 4b from FIG. 5 when opened out.

In the case of conventional configurations, in the first pole core body 5 and the second pole core body 6, as shown in FIG. 3, tip portion regions are displaced relative to root portions of the first and second claw-shaped magnetic poles 4a and 4b due to centrifugal force. Because the first pole core body 5 and the second pole core body 6 have identical shapes and equal rigidity, they are displaced by an equal displacement height T, and the permanent magnets 7 are supported at the root portions of the first and second claw-shaped magnetic poles 4a and 4b, which have a high strength, in other words, at action points A and B positioned at diagonally opposite corners of the rectangular permanent magnets 7. Consequently, reaction forces act at two diagonally opposite points in the permanent magnets 7, giving rise to bending moments along straight lines C, and making it more likely that the permanent magnets will be damaged by plastic deformation, or by fatigue failure, etc.

In contrast, in the rotor according to Embodiment 1, because the groove 9 is formed around the entire circumference of the first disk portion 3a of the first pole core body 5, the rigidity of the root portions of the first pole core body 5 is less than the rigidity of the root portions of the second pole core body 6, and as shown in FIG. 5, a displacement height T1 of the first claw-shaped magnetic poles 4a of the first pole core body 5 accompanying the rotation of the rotor is greater than a displacement height T2 of the second claw-shaped magnetic poles 4b of the first pole core body 6. Consequently, although there is no change in the action point B of the reaction force from the second claw-shaped magnetic poles 4b acting on the permanent magnets 7 compared to the conventional configurations, as shown in FIG. 6, because the reaction force from the first claw-shaped magnetic poles 4a acting on the permanent magnets 7 acts through the entire surface of the flange portions 8a of the first claw-shaped magnetic poles 4a indicated by hatching, concentrations of stress are avoided, and the leverage of the bending moment across to the straight line C is also shortened and reduced, improving durability of the permanent magnets 7 during high revolution In conventional configurations, the permanent magnets often may not be supported by the root portions of the claw-shaped magnetic poles during rotation due to external factors such as vibration of the alternator, etc., making the amount of radial displacement near the tip portions of the claw-shaped magnetic poles that much less constant, and in order to avoid that, design of the claw-shaped magnetic poles must be made on the assumption that a maximum load will act on each portion of each of the claw-shaped magnetic poles.

In contrast, in the configuration of this embodiment, because the permanent magnets 7 are additionally supported along entire surfaces of the flange portions 8a of the first claw-shaped magnetic poles 4a during rotation of the rotor, the amount of radial displacement near the tip portions of the first and second claw-shaped magnetic poles 4a and 4b is more stable than in conventional configurations, and the amount of displacement thereof can even be predicted, thereby enabling an optimum air gap to be set between the rotor and the surrounding stator.

Embodiment 2

Figure 7:
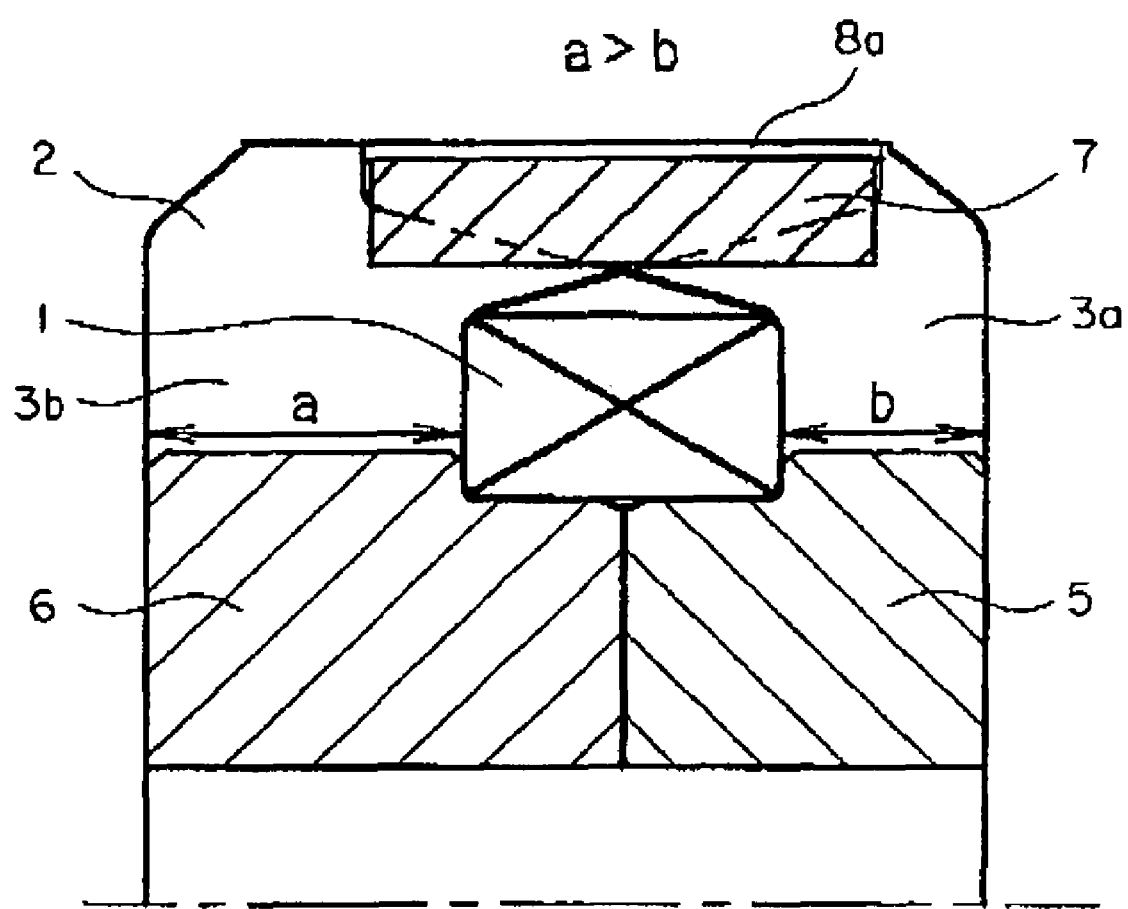
FIG. 7 is a partial cross section showing an automotive alternator rotor according to Embodiment 2 of the present invention.

FIG. 7 is a partial cross section showing an automotive alternator rotor according to Embodiment 2 of the present invention.

In this embodiment, an axial length b of a first disk portion 3a of a first pole core body 5 is less than an axial length a of a second disk portion 3b of a second pole core body 6.

In this embodiment, the first disk portion 3a of the first pole core body 5 having an axial length b that is shorter than the axial length a of the second disk portion 3b of the second pole core body 6 constitutes a displacement increasing means, and the rigidity of the root portions of the first pole core body 5 is less than the rigidity of the root portions of the second pole core body 6. Consequently, because end portions of the first claw-shaped magnetic poles 4a of the first pole core body 5 are displaced more in a radial direction than end portions of the second claw-shaped magnetic poles 4b of the second pole core body 6 during rotation of the rotor, concentrations of stress are avoided in a similar manner to Embodiment 1 because the reaction force from the first claw-shaped magnetic poles 4a acting on the permanent magnets 7 acts through the entire surface of the flange portions 8a of the first claw-shaped magnetic poles 4a, and the bending moment acting on the permanent magnets 7 is also reduced, improving durability of the permanent magnets 7 during high revolution Embodiment 3

Figure 8:
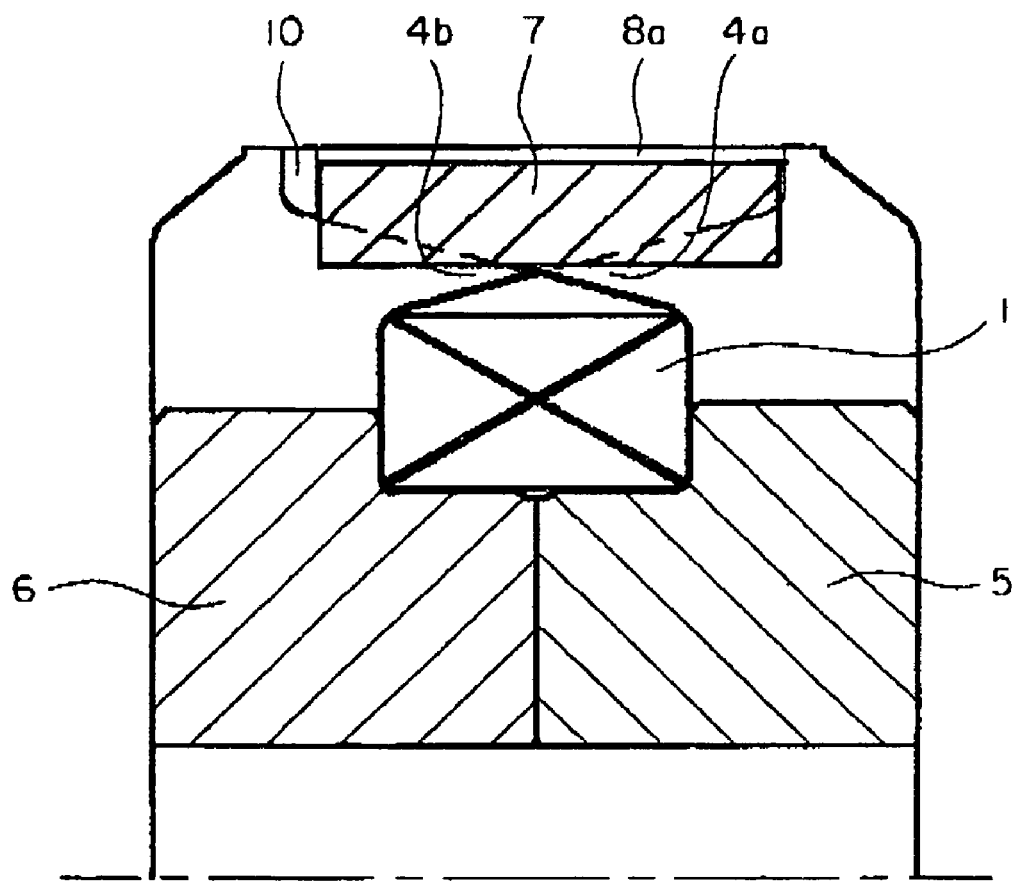
FIG. 8 is a partial cross section showing an automotive alternator rotor according to Embodiment 3 of the present invention.

FIG. 8 is a partial cross section showing an automotive alternator rotor according to Embodiment 3 of the present invention.

In this embodiment, hook portions 10 for restricting axial movement of permanent magnets 7 are disposed on tip portions of first claw-shaped magnetic poles 4a of a first pole core body 5. By disposing these hook portions 10, which constitute a displacement increasing means, on the tip portions of the first claw-shaped magnetic poles 4a, the weight of the first pole core body 5 is increased, increasing the centrifugal force acting on the first claw-shaped magnetic poles 4a during rotation. Consequently, the amount of radial displacement of the first claw-shaped magnetic poles 4a is greater than that of the second claw-shaped magnetic poles 4b, giving rise to an imbalance in the amount of displacement between the first pole core body 5 and the second pole core body 6, and as a result similar effects to those in Embodiment 1 can also be achieved using the rotor according to Embodiment 3.

The imbalance of the displacement in the first pole core body 5 and the second pole core body 6 is possible simply by disposing the hook portions 10 on the tip portions of the first claw-shaped magnetic poles 4a, and the amount of imbalance can be adjusted simply by adjusting the weight of the hook portions 10.

Embodiment 4

Figure 9:
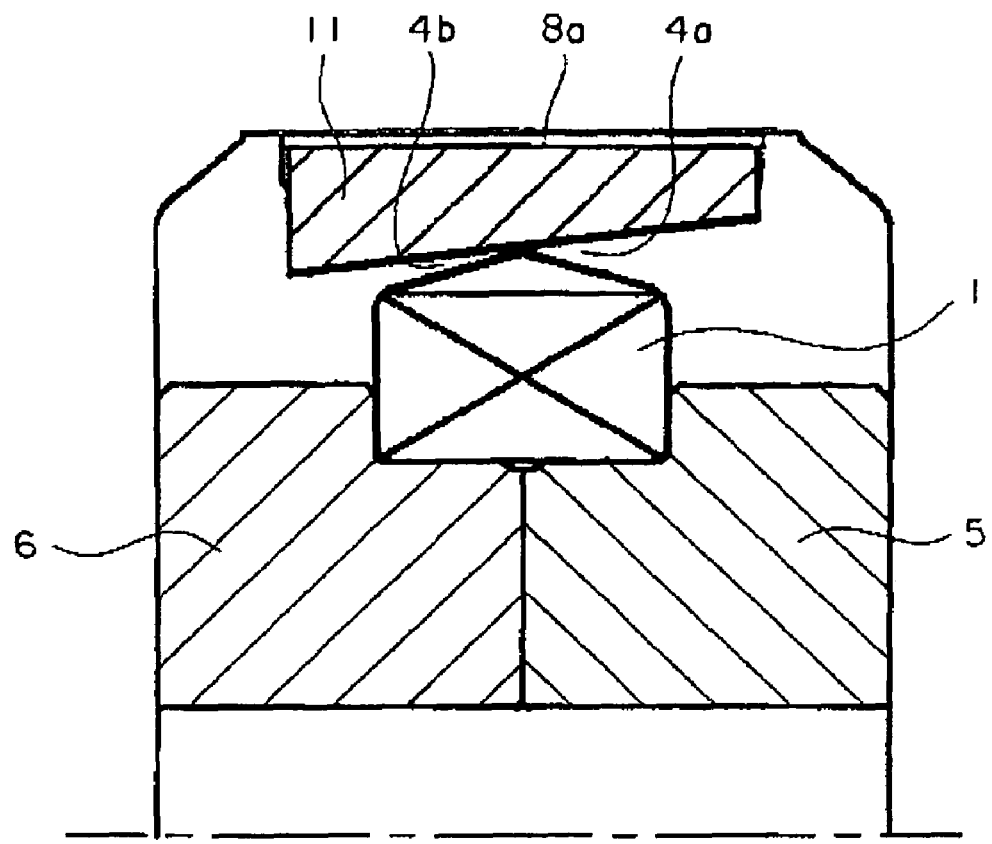
FIG. 9 is a partial cross section showing an automotive alternator rotor according to Embodiment 4 of the present invention.

FIG. 9 is a partial cross section showing an automotive alternator rotor according to Embodiment 4 of the present invention.

In this embodiment, a radial thickness of permanent magnets 11 gradually increases from root portions of first claw-shaped magnetic poles 4a of the first pole core body 5 toward tip portions In this embodiment, the permanent magnets 11 having radial wall thickness dimensions that gradually differ constitute a displacement increasing means, the center of gravity of the trapezoidal shape-shaped permanent magnets 11 being biased toward the tip portions of the first claw-shaped magnetic poles 4a, and subjecting the tip portion regions of the first claw-shaped magnetic poles 4a of the first pole core body 5 to a larger centrifugal force, thereby giving rise to an imbalance in the amount of displacement between the first pole core body 5 and the second pole core body 6, and as a result similar effects to those in Embodiment 1 can also be achieved using the rotor according to Embodiment 4.

In this embodiment, the permanent magnets 11 having radial wall thickness dimensions that gradually differ constitute a displacement increasing means, enabling the first pole core body 5 and the second pole core body 6 to have identical shapes, thereby reducing manufacturing costs.

Moreover, the center of gravity of the permanent magnets 7 may also be biased toward the tip portions of the first claw-shaped magnetic poles 4a by varying internal composition of the permanent magnets 7. For example, the composition ratio between iron-neodymium (FeNd) and a binder in a plastic magnet may be adjusted such that density is greater near a tip portion of the first claw-shaped magnetic poles 4a than near a root. More specifically, by first injection molding a high-density portion of the permanent magnets 7 near the tip portion of the first claw-shaped magnetic poles 4a, and then injection molding a low-density portion of the permanent magnets 7 near a root of the first claw-shaped magnetic poles 4a, permanent magnets 7 can be manufactured in which the center of gravity is biased toward the tip portion region of the first claw-shaped magnetic poles 4a.

By also giving consideration to points such as magnetic flux, strength, etc., when setting the internal composition of the permanent magnets 7, output from the alternator can also be improved Embodiment 5

Figure 10:
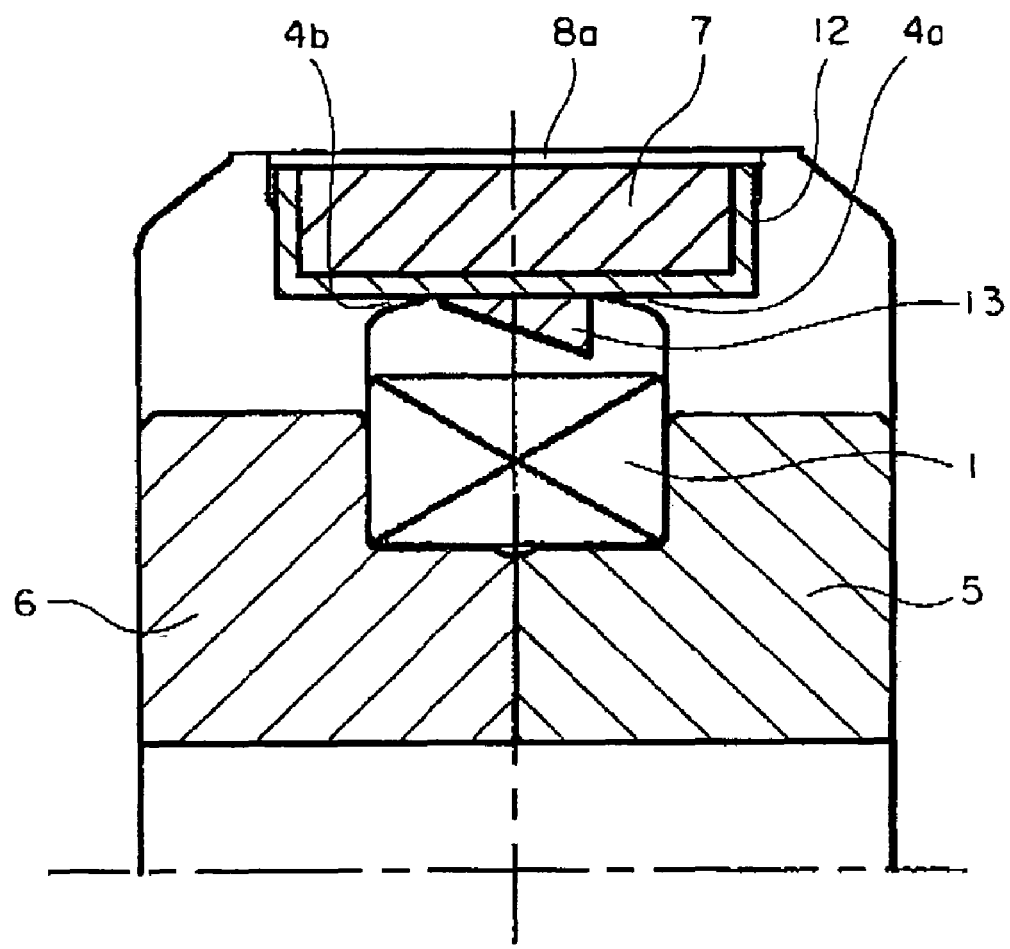
FIG. 10 is a partial cross section showing an automotive alternator rotor according to Embodiment 5 of the present invention.

FIG. 10 is a partial cross section showing an automotive alternator rotor according to Embodiment 5 of the present invention.

In this embodiment, permanent magnets 7 are held by holding members 12. The holding members 12 are linked at a bottom surface portion by a ring-shaped linking member 13 extending in a circumferential direction The radial thickness of this linking member 13 is varied such that rigidity is lower near a tip portion than near a root portion in first claw-shaped magnetic poles 4a of a first pole core body 5, and rigidity is higher near a tip portion than near a root portion in second claw-shaped magnetic poles 4b of a second pole core body 6.

In this embodiment, the linking member 13 in which rigidity is lower near a tip portion of the first claw-shaped magnetic poles 4a and rigidity is higher near a tip portion of the second claw-shaped magnetic poles 4b constitutes a displacement increasing means, and because the tip portion regions of the first claw-shaped magnetic poles 4a deform more in a radial direction relative to centrifugal force than the tip portion regions of the second claw-shaped magnetic poles 4b, an imbalance arises in the amount of displacement between the first pole core body 5 and the second pole core body 6, and as a result similar effects to those in Embodiment 1 can also be achieved using the rotor according to Embodiment 5

An imbalance in the displacement of the first and second claw-shaped magnetic poles 4a and 4b can be created without modifying designs that ensure optimum electromagnetism, enabling shapes of the first and second claw-shaped magnetic poles 4a and 4b and the permanent magnets 7 to be designed so as to obtain optimum output.

Embodiment 6

Figure 11:
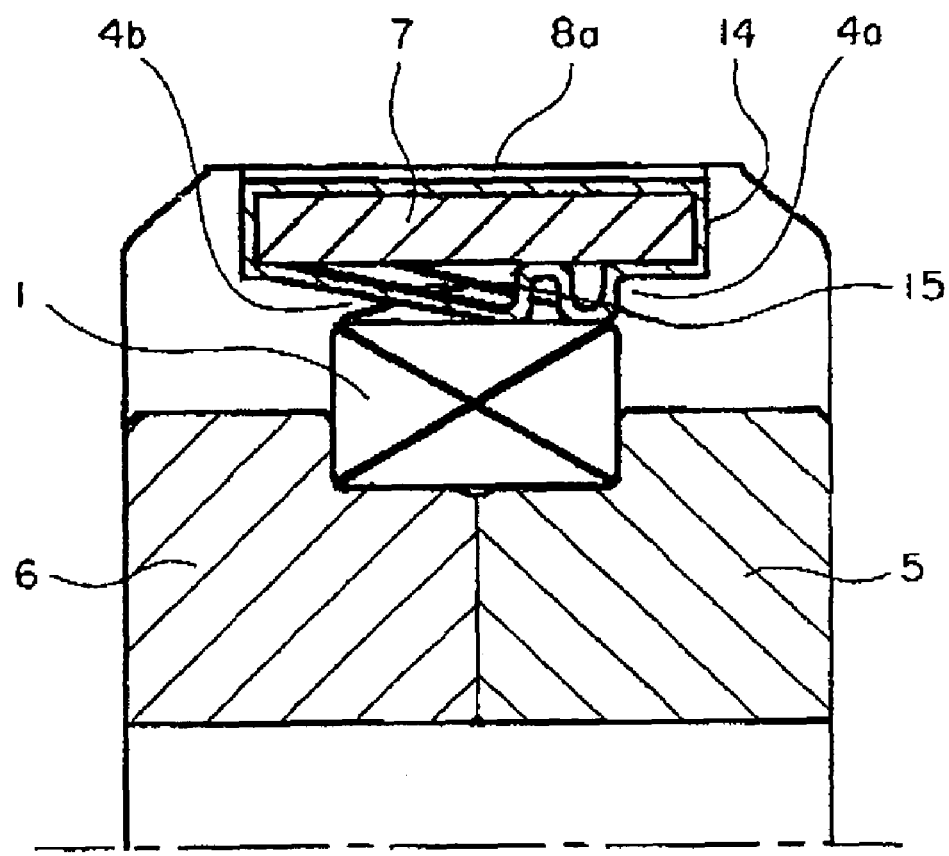
FIG. 11 is a partial cross section showing an automotive alternator rotor according to Embodiment 6 of the present invention.

FIG. 11 is a partial cross section showing an automotive alternator rotor according to Embodiment 6 of the present invention.

In this embodiment, permanent magnets 7 are held by holding members 14. A bottom surface portion of each of the holding members 14 is constituted by a leaf spring 15 functioning by plastic deformation, and these leaf springs 15 press tip portions radially outward in first claw-shaped magnetic poles 4a of a first pole core body 5, and press root portions radially outward in second claw-shaped magnetic poles 4b of a second pole core body 6.

In this embodiment, the holding members 14, including the leaf springs 15 that press the tip portion regions of the first claw-shaped magnetic poles 4a and the root portion regions of the second claw-shaped magnetic poles 4b radially outward, constitute a displacement increasing means, and because the pressure from the leaf springs 15 and the centrifugal force of the permanent magnets 7 acts on the end portions of the first claw-shaped magnetic poles 4a and deforms them more than the adjacent second claw-shaped magnetic poles 4b when the rotor rotates, an imbalance arises in the amount of displacement between the first pole core body 5 and the second pole core body 6, also enabling similar effects to those in Embodiment 5 to be achieved Because the deformable leaf springs 15 are interposed between each of the permanent magnets 7 and the rotor coil 1, the tolerance ranges of the radial dimensional precision of the permanent magnets 7 and of the rotor coil 1 are increased, reducing rotor manufacturing costs.

Embodiment 7

Figure 12:
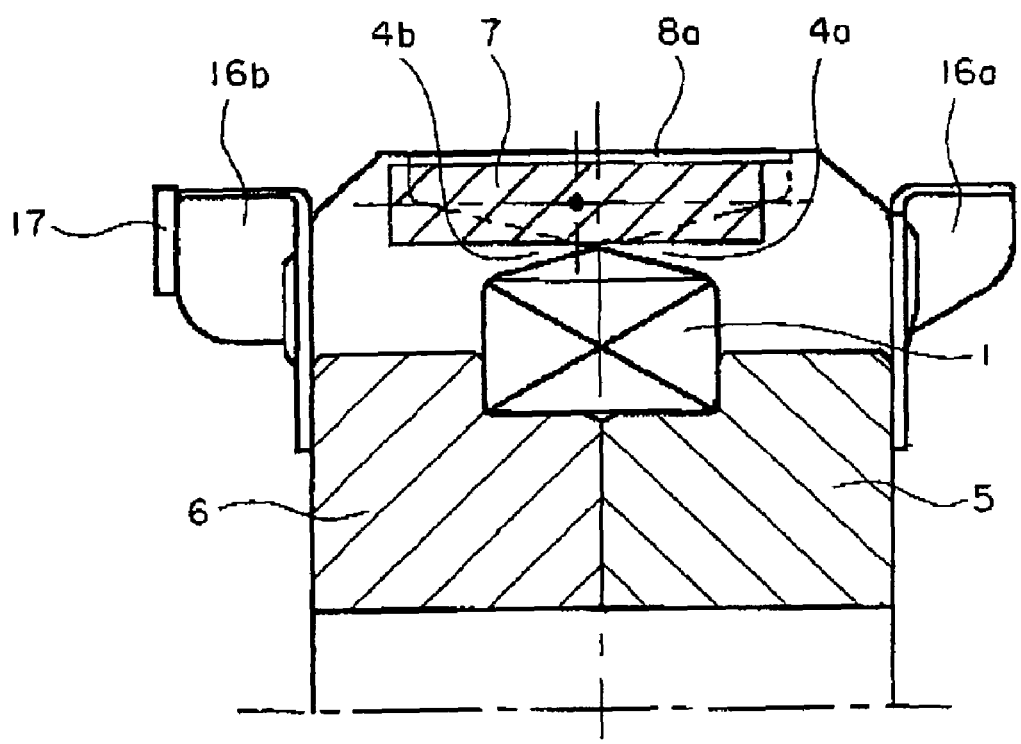
FIG. 12 is a partial cross section showing an automotive alternator rotor according to Embodiment 7 of the present invention.

FIG. 12 is a partial cross section showing an automotive alternator rotor according to Embodiment 7 of the present invention.

In this embodiment, rectangular permanent magnets 7 are biased toward a second pole core body 6, and centers of gravity of the permanent magnets 7 are thereby also biased toward the second pole core body 6.

Figure 13:
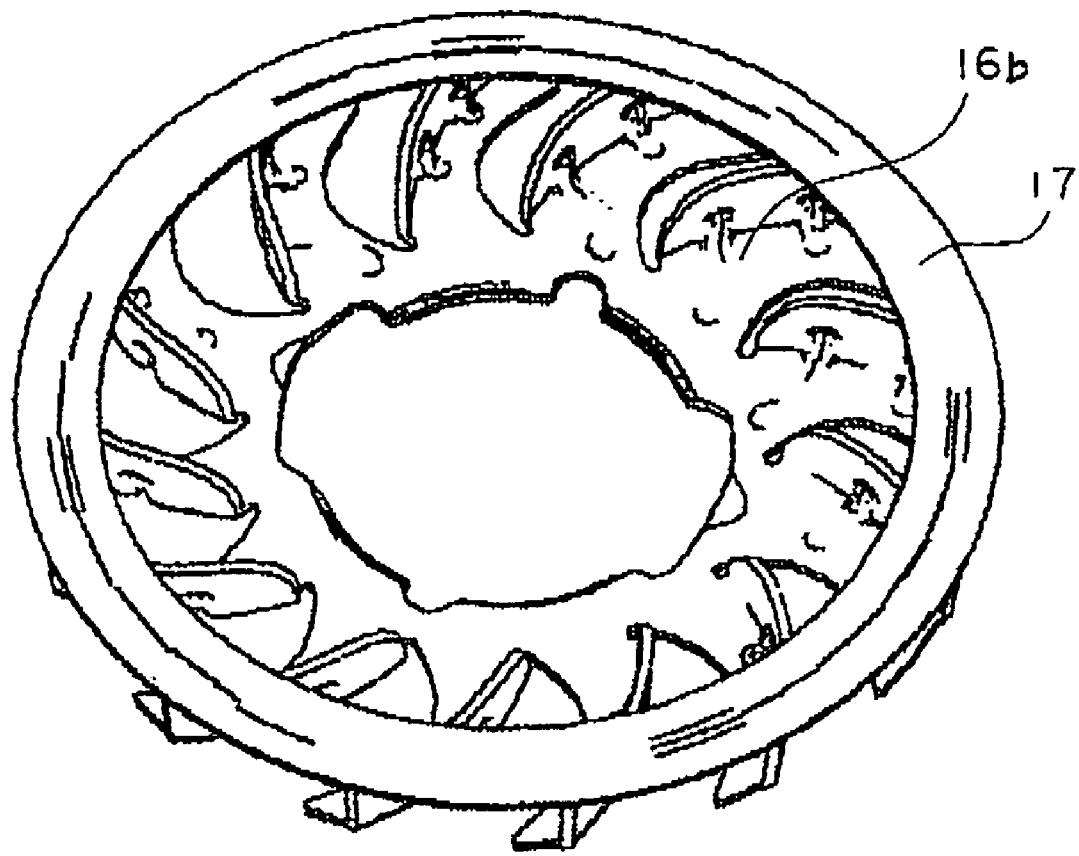
FIG. 13 is an overall perspective showing a fan from FIG. 12.

A first fan 16a and a second fan 16b for cooling are mounted to end surfaces of the first pole core body 5 and the second pole core body 6, respectively. A fan blade 17, shown in FIG. 13, is mounted to the second fan 16b mounted to the second pole core body 6.

In this embodiment, the biased permanent magnets 7 constitute a displacement increasing means, and a larger centrifugal force acts on the tip portion regions of the first claw-shaped magnetic poles 4a of the first pole core body 5.

The fan blade 17 increasing the rigidity of the second pole core body 6 also constitutes a displacement increasing means, and radial deformation of the second claw-shaped magnetic poles 4b of the second pole core body 6 due to centrifugal force is reduced proportionately compared to the first claw-shaped magnetic poles 4a of the first pole core body 5, and combined with the bias of the center of gravity of the permanent magnets 7, an imbalance arises in the amount of displacement between the first pole core body 5 and the second pole core body 6, enabling similar effects to those in Embodiment 1 to be achieved.

By combining two displacement increasing means, the imbalance in the amount of displacement between the first pole core body 5 and the second pole core body 6 can be generated more reliably, and the imbalance in the displacement of the first and second claw-shaped magnetic poles 4a and 4b can be created without modifying designs that ensure optimum electromagnetism, enabling shapes of the first and second claw-shaped magnetic poles 4a and 4b and the permanent magnets 7 to be designed so as to obtain optimum output.

The first pole core body 5 and the second pole core body 6 may also have identical shapes, enabling manufacturing costs to be reduced.

Moreover, the rigidity of the fans can also be changed in other ways such as, for example, by changing a sheet thickness of a base plate of the fans, or changing the material thereof, or mounting a fan at only one end, etc.

Embodiment 8

Figure 14:
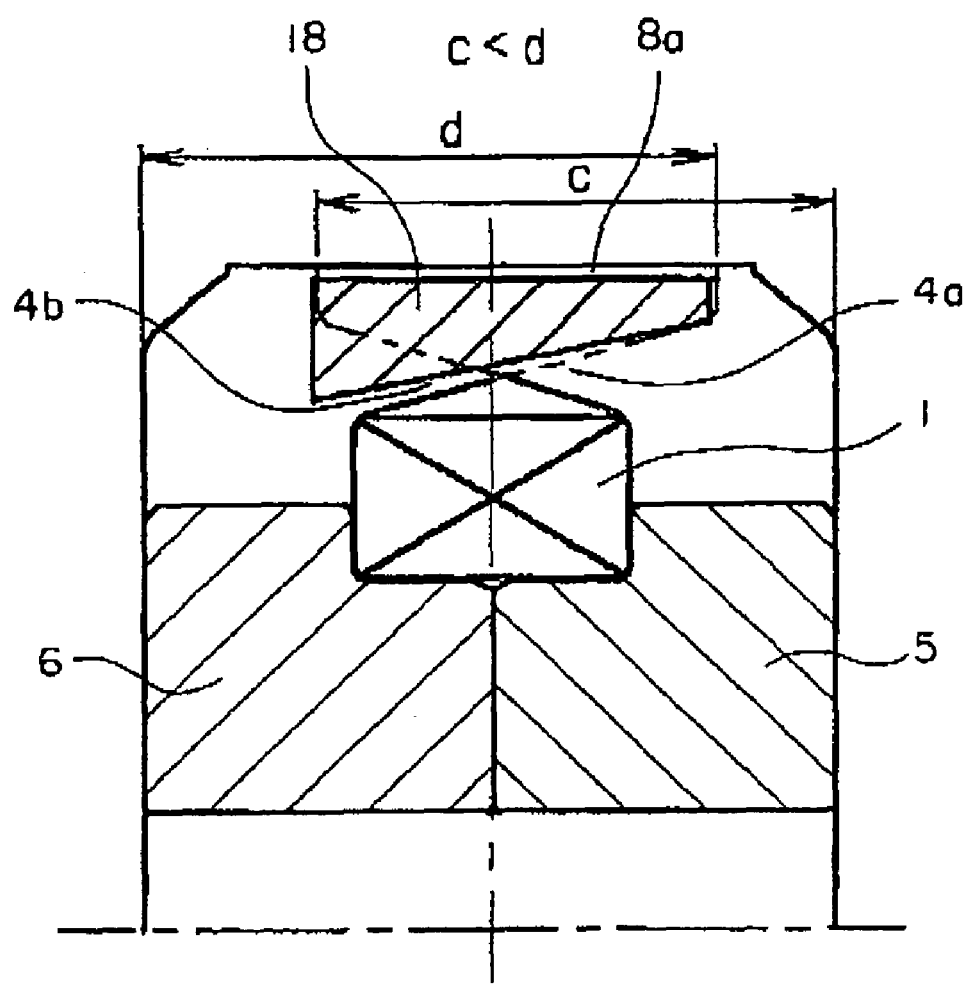
FIG. 14 is a partial cross section showing an automotive alternator rotor according to Embodiment 8 of the present invention.

FIG. 14 is a partial cross section showing an automotive alternator rotor according to Embodiment 8 of the present invention.

In this embodiment, an axial length c of first claw-shaped magnetic poles 4a is shorter than an axial length d of second claw-shaped magnetic poles 4b.

Permanent magnets 18 have a trapezoidal shape in which a radial thickness increases toward tip portion regions of the first claw-shaped magnetic poles 4a, a center of gravity of the trapezoidal shape-shaped permanent magnets 18 being biased toward the second claw-shaped magnetic poles 4b.

In this embodiment, the trapezoidal permanent magnets 18 constitute a displacement increasing means, and a larger centrifugal force acts on the tip portion regions of the first claw-shaped magnetic poles 4a of the first pole core body 5.

Figure 15:
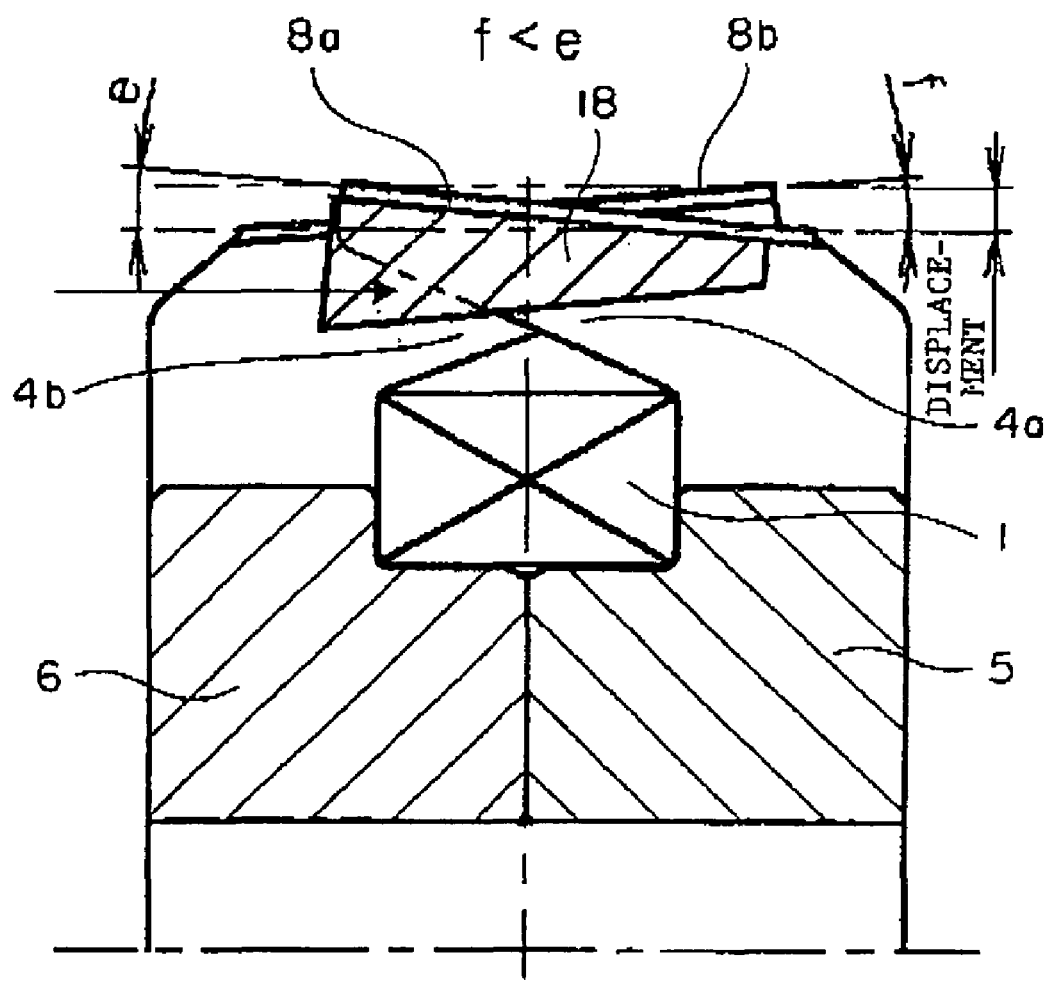
FIG. 15 is a partial cross section showing the rotor from FIG. 14 during rotation.

FIG. 15 is a diagram showing a radially-displaced state of the first claw-shaped magnetic poles 4a and the second claw-shaped magnetic poles 4b due to torque, a displacement angle e of the first claw-shaped magnetic poles 4a being greater than a displacement angle f of the second claw-shaped magnetic poles 4b due to the permanent magnets 18 having a center of gravity that is biased, and an imbalance arises in the displacement between the first pole core body 5 and the second pole core body 6, enabling similar effects to those in Embodiment 1 to be achieved.

Because the length c of the first claw-shaped magnetic poles 4a is shorter than the length d of the second claw-shaped magnetic poles 4b, the amount of radial displacement of the first claw-shaped magnetic poles 4a and the second claw-shaped magnetic poles 4b is equal, and the air gap between the stator core and the rotor is also equal for both the first claw-shaped magnetic poles 4a and the second claw-shaped magnetic poles 4b, the air gap needing only to be matched to the second claw-shaped magnetic poles 4b having the smaller displacement angle, and output is improved.

Moreover, in each of the above embodiments, output from the alternator may also be improved by reducing the air gap by making the axial length of the claw-shaped magnetic poles of the first pole core body, which have a larger displacement angle displaced more in a radial direction than the claw-shaped magnetic poles of the second pole core body, shorter than the axial length of the claw-shaped magnetic poles of the second pole core body.

Embodiment 9

Figure 16:
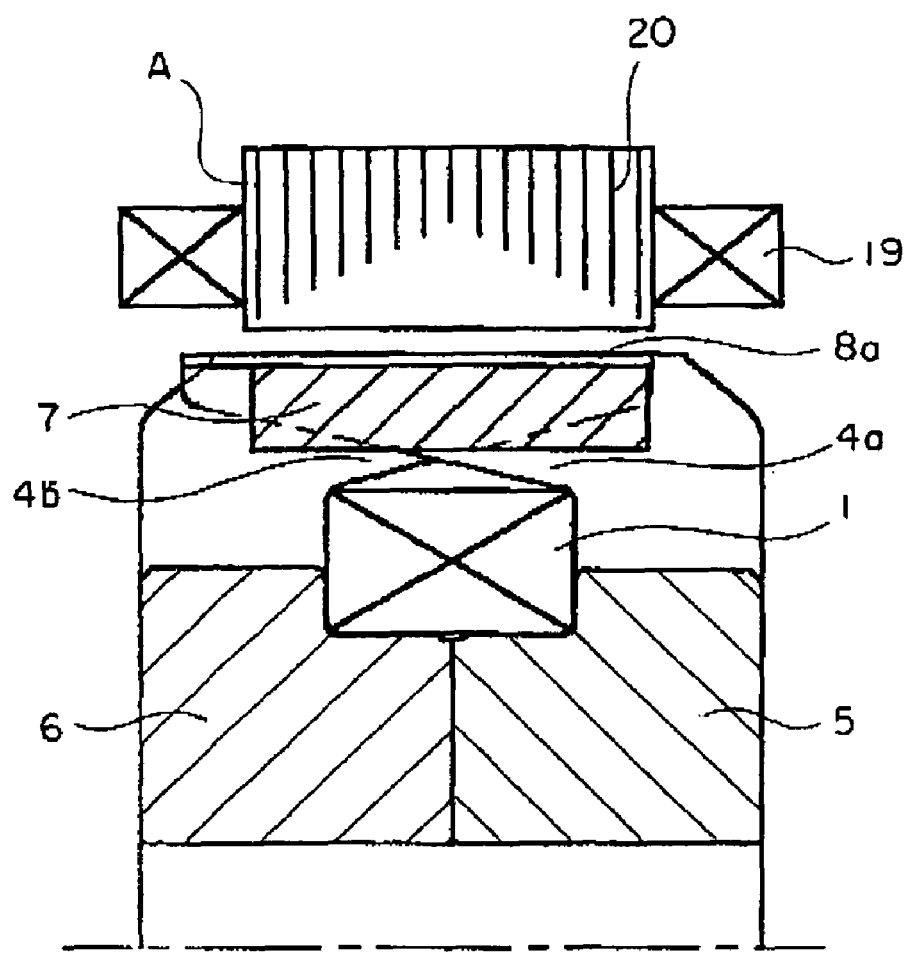
FIG. 16 is a partial cross section showing an automotive alternator rotor according to Embodiment 9 of the present invention.

FIG. 16 is a partial cross section showing an automotive alternator rotor according to Embodiment 9 of the present invention.

In this embodiment, an axial length of first claw-shaped magnetic poles 4a is longer than an axial length of second claw-shaped magnetic poles 4b. A stator disposed on an outer periphery of the rotor is configured by installing a stator winding 19 in a ring-shaped stator core 20, and the length of the first claw-shaped magnetic poles 4a extends axially outward beyond an end surface A of the stator core 20.

In this embodiment, the first claw-shaped magnetic poles 4a extending axially outward beyond the end surface A of the stator core 20 constitute a displacement increasing means, the weight of the first claw-shaped magnetic poles 4a being increased by an amount proportionate to their length being longer than the second claw-shaped magnetic poles 4b, and a proportionately larger centrifugal force acts on the first claw-shaped magnetic poles 4a of the first pole core body 5. As a result, an imbalance arises in the displacement between the first pole core body 5 and the second pole core body 6, enabling similar effects to those in Embodiment 1 to be achieved.

The length of the first claw-shaped magnetic poles 4a extends axially outward beyond the end surface A of the stator core 20, and the amount of radial displacement of the first claw-shaped magnetic poles 4a and the second claw-shaped magnetic poles 4b is equal within the region of the stator core 20 portions of the first claw-shaped magnetic poles 4a in which the amount of radial displacement is greater than in the second claw-shaped magnetic poles 4b being positioned outside the region of the stator core 20. Consequently, although the centrifugal force relative to the permanent magnets 7 is mostly borne by the first claw-shaped magnetic poles 4a having the larger displacement, the air gap can be reduced proportionately simply by setting the air gap to match the second claw-shaped magnetic poles 4b having the smaller amount of displacement, enabling output from the generator to be improved.

Moreover, in each of the above embodiments, it is possible to increase the imbalance in the displacement of the first claw-shaped magnetic poles and the second claw-shaped magnetic poles further by combining each of the displacement increasing means.

In each of the above embodiments, an automotive alternator rotor constituting a dynamoelectric machine has been explained, but the present invention can also be applied to rotors of electric motors, generator-motors, etc., which also constitute dynamoelectric machines.

What is claimed is:

1. A dynamoelectric rotor comprising:
a rotor coil for generating a magnetic flux;
a first pole core body and a second pole core body disposed so as to face each other, respectively having:
first and second cylindrical portions on which said rotor coil is installed;
first and second disk portions extending radially outward from first and second end portions of said first and second cylindrical portions; and
a plurality of first and second claw-shaped magnetic poles extending axially inward from said first and second disk portions so as to alternately intermesh with each other, said first and second claw-shaped magnetic poles covering said rotor coil and being magnetized into North-seeking (N) poles and South-seeking (S) poles by said magnetic flux; and
permanent magnets disposed between adjacent pairs of said first and second claw-shaped magnetic poles, said permanent magnets reducing magnetic leakage flux between said adjacent claw-shaped magnetic poles,
flange portions projecting in a circumferential direction and restricting radial movement of said permanent magnets due to centrifugal force being formed on first and second side surfaces of said claw-shaped magnetic poles, and
tip portion regions of said first claw-shaped magnetic poles of said first pole core body and tip portion regions of said second claw-shaped magnetic poles of said second pole core body being displaced radially outward relative to respective root portions due to said centrifugal force,
wherein said dynamoelectric rotor further comprises:
a displacement increasing means for making said first claw-shaped magnetic poles of said first pole core body radially displace more than said second claw-shaped magnetic poles of said second pole core body.

2. The dynamoelectric rotor according to claim 1, wherein:
said displacement increasing means is constituted by said first disk portion of said first pole core body having a groove extending in a circumferential direction.

3. The dynamoelectric rotor according to claim 1, wherein:
said displacement increasing means is constituted by said first disk portion of said first pole core body having an axial length that is shorter than an axial length of said second disk portions of said second pole core body.

4. The dynamoelectric rotor according to claim 1, wherein:
said displacement increasing means is constituted by a hook portion disposed on a tip portion of said first claw-shaped magnetic poles of said first pole core body to restrict axial movement of said permanent magnets.

5. The dynamoelectric rotor according to claim 1, wherein:
said displacement increasing means is constituted by said permanent magnets having a radial wall thickness dimension that gradually increases toward said tip portion regions of said first claw-shaped magnetic poles.

6. The dynamoelectric rotor according to claim 1, wherein:
said permanent magnets are surrounded and held by holding members; and
said displacement increasing means is constituted by a linking member extending in a circumferential direction on a radially-inner side of said holding members to link said holding members, said linking member having a lower rigidity near said tip portion regions of said first claw-shaped magnetic poles of said first pole core body than near said root portions.

7. The dynamoelectric rotor according to claim 1, wherein:
said displacement increasing means is constituted by a holding member surrounding and holding each of said permanent magnets and having a leaf spring on a radially-inner side for pressing said tip portion regions of said first claw-shaped magnetic poles of said first pole core body radially outward.

8. The dynamoelectric rotor according to claim 1, wherein:
said displacement increasing means is constituted by said permanent magnets having a higher density near said tip portion regions of said first claw-shaped magnetic poles of said first pole core body than near said root portions.

9. The dynamoelectric rotor according to claim 1, wherein:
said displacement increasing means is constituted by said permanent magnets having a greater radial thickness near said tip portion regions of said first claw-shaped magnetic poles of said first pole core body than near said root portions.

10. The dynamoelectric rotor according to claim 1, wherein:
said displacement increasing means is constituted by said permanent magnets having a center of gravity that is biased toward said tip portion regions of said first claw-shaped magnetic poles of said first pole core body.

11. The dynamoelectric rotor according to claim 1, wherein:
a first cooling fan and a second cooling fan are disposed on said root portions of said first claw-shaped magnetic poles of said first pole core body and said root portions of said second claw-shaped magnetic poles of said second pole core body, respectively; and
said displacement increasing means is constituted by a fan blade that increases rigidity of said second cooling fan.

12. The dynamoelectric rotor according to claim 1, wherein:
said displacement increasing means is constituted by said first claw-shaped magnetic poles extending axially outward beyond an end surface of a stator core surrounding said rotor.

13. The dynamoelectric rotor according to claim 1, wherein:
an axial length of said first claw-shaped magnetic poles is shorter than an axial length of said second claw-shaped magnetic poles.

* * * * *